(12) United States Patent
Wang et al.

(10) Patent No.: US 9,066,104 B2
(45) Date of Patent: Jun. 23, 2015

(54) SPATIAL BLOCK MERGE MODE

(75) Inventors: Limin Wang, San Diego, CA (US); Yue Yu, San Diego, CA (US); Jian Lou, San Diego, CA (US)

(73) Assignee: GOOGLE INC., Mountain View, CA (US)

( * ) Notice: Subject to any disclaimer, the term of this patent is extended or adjusted under 35 U.S.C. 154(b) by 695 days.

(21) Appl. No.: 13/351,782

(22) Filed: Jan. 17, 2012

(65) Prior Publication Data

US 2013/0016785 A1    Jan. 17, 2013

Related U.S. Application Data

(60) Provisional application No. 61/433,004, filed on Jan. 14, 2011.

(51) Int. Cl.
| H04N 7/34 | (2006.01) |
| H04N 19/196 | (2014.01) |
| H04N 19/52 | (2014.01) |
| H04N 19/176 | (2014.01) |

(52) U.S. Cl.
CPC ........... *H04N 19/196* (2014.11); *H04N 19/197* (2014.11); *H04N 19/52* (2014.11); *H04N 19/176* (2014.11)

(58) Field of Classification Search
None
See application file for complete search history.

(56) References Cited

U.S. PATENT DOCUMENTS

| 5,144,426 | A | 9/1992 | Tanaka et al. |
| 5,737,020 | A | 4/1998 | Hall et al. |
| 6,134,518 | A | 10/2000 | Cohen et al. |
| 6,144,322 | A | 11/2000 | Sato |
| 6,373,895 | B2 | 4/2002 | Saunders et al. |
| 6,449,312 | B1 | 9/2002 | Zhang et al. |
| 7,466,774 | B2 | 12/2008 | Boyce |
| 7,529,302 | B2 | 5/2009 | Mukerjee et al. |
| 7,580,456 | B2 | 8/2009 | Li et al. |
| 7,606,310 | B1 | 10/2009 | Ameres et al. |
| 7,809,059 | B2 | 10/2010 | Yin et al. |
| 8,005,144 | B2 | 8/2011 | Ji et al. |
| 8,085,845 | B2 | 12/2011 | Tourapis et al. |
| 8,705,616 | B2 | 4/2014 | He et al. |
| 8,718,140 | B1 | 5/2014 | Cai et al. |

(Continued)

FOREIGN PATENT DOCUMENTS

| JP | 2007267414 | 10/2007 |
| WO | WO2009051419 | 4/2009 |

OTHER PUBLICATIONS

Winken, et al., "Video Coding Technology Proposal by Fraunhofer HHI", Document # JCTVC-A116, Dresden, Germany, pp. 9-10, Apr. 24, 2010.

(Continued)

*Primary Examiner* — Sath V Perungavoor
*Assistant Examiner* — Kate Luo
(74) *Attorney, Agent, or Firm* — Young Basile Hanlon & MacFarlane P.C.

(57) ABSTRACT

In one embodiment, a spatial merge mode for a block of video content may be used in merging motion parameters. Spatial merge parameters are considered and do not require utilization of bits or flags or indexing to signal at the encoder or decoder. If the spatial merge mode is determined, the method merges the block of video content with a spatially-located block, where merging shares motion parameters between the spatially-located block and the block of video content.

25 Claims, 9 Drawing Sheets

(56) References Cited

U.S. PATENT DOCUMENTS

| | | | |
|---|---|---|---|
| 8,737,824 | B1 | 5/2014 | Bultje |
| 2003/0014674 | A1 | 1/2003 | Huffman et al. |
| 2003/0022102 | A1 | 1/2003 | Hiraoka et al. |
| 2003/0061040 | A1 | 3/2003 | Likhachev et al. |
| 2003/0227977 | A1 | 12/2003 | Henocq |
| 2005/0207497 | A1 | 9/2005 | Rovati et al. |
| 2006/0215751 | A1 | 9/2006 | Reichel et al. |
| 2006/0245497 | A1 | 11/2006 | Tourapis et al. |
| 2007/0047648 | A1 | 3/2007 | Tourapis et al. |
| 2007/0047649 | A1 | 3/2007 | Suzuki et al. |
| 2007/0053427 | A1 | 3/2007 | Henocq |
| 2007/0140352 | A1 | 6/2007 | Bhaskaran et al. |
| 2007/0153897 | A1 | 7/2007 | Yan |
| 2007/0153899 | A1 | 7/2007 | Koto et al. |
| 2008/0212678 | A1 | 9/2008 | Booth et al. |
| 2008/0260031 | A1 | 10/2008 | Karczewicz |
| 2008/0267292 | A1 | 10/2008 | Ito et al. |
| 2008/0285655 | A1 | 11/2008 | Au et al. |
| 2009/0010556 | A1 | 1/2009 | Uchibayashi et al. |
| 2009/0110067 | A1 | 4/2009 | Sekiguchi et al. |
| 2009/0175338 | A1 | 7/2009 | Segall |
| 2009/0232207 | A1 | 9/2009 | Chen |
| 2009/0257492 | A1 | 10/2009 | Andersson et al. |
| 2010/0034260 | A1 | 2/2010 | Shimizu et al. |
| 2010/0195715 | A1 | 8/2010 | Liu et al. |
| 2010/0220790 | A1 | 9/2010 | Jeon et al. |
| 2010/0290530 | A1 | 11/2010 | Huang et al. |
| 2010/0303149 | A1 | 12/2010 | Yasuda et al. |
| 2010/0322306 | A1 | 12/2010 | Au et al. |
| 2011/0182357 | A1 | 7/2011 | Kim et al. |
| 2011/0222608 | A1 | 9/2011 | Gao et al. |
| 2011/0235930 | A1 | 9/2011 | Kim et al. |
| 2011/0243229 | A1 | 10/2011 | Kim et al. |
| 2011/0249734 | A1 | 10/2011 | Segall et al. |
| 2011/0261886 | A1 | 10/2011 | Suzuki et al. |
| 2012/0027094 | A1 | 2/2012 | Sato et al. |
| 2013/0027230 | A1 | 1/2013 | Marpe et al. |

OTHER PUBLICATIONS

Yusuke Itani et al, "Adaptive Direct Vector Derivation for Video Coding," Picture Coding Symposium, Dec. 8, 2010C509, Guangzhou, China, Oct. 2010.

Li B, et al., "Redundancy reduction in Cbf and merge coding", Document # JCTVC-C277, p. 6, Oct. 2, 2010.

Patent Cooperation Treaty, International Search Report and Written Opinion of the International Searching Authority for International Application No. PCT/US2012/021599), Mar. 28, 2012.

M. Winken, et al., "Description of Video Coding Technology Proposal by Fraunhofer HHI", Document # JCTVC-A116, Dresden, Germany, Apr. 2010.

J. Jung, "Core Experiment 9: Motion Vector Coding", Document # JCTVC-0509, Guangzhou, China, Oct. 2010.

Chen, et al., "SaVE: Sensor-assisted Motion Estimation for Efficient H.264/AVC Video Encoding." MM'09, Oct. 19-24, 2009, 10 pages, ACM, Beijing, China.

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

Guillotel, Philippe, et al.; "Comparison of motion vector coding techniques", SPIE vol. 2308, 1994, 11 pp.

H.264 video compression standard.: New possibilities within video surveillance. 2008, 10 pages, Axis Communications.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

ISR and Written Opinion of the International Searching Authority for International Application No. PCT/U52012/021606, Mar. 28, 2012.

Karczewicz, Marta, et al.; "Video Coding Using Motion Compensation With Polynomial Motion Vector Fields", IEEE Comsoc EURASIP, First International Workshop on Wireless Image/Video Communications—Sep. 1996, 6 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Li S., et al.; "Direct Coding for Bipredicitive Slices in the H.264 Standard," IEEE Transactions on Circuits and Systems for Video Technology; vol. 15; No. 1; pp. 119-126; Jan. 1, 2005.

Liu, Bede, et al.; "A simple method to segment motion field for video coding", SPIE vol. 1818, Visual Communications and Image Processing 1992, 10 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

Martin, Graham R, et al.; "Reduced Entropy Motion Compensation Using Variable Sized Blocks", SPIE vol. 3024, 1997, 10 pp.

Mozilla, "Introduction to Video Coding Part 1: Transform Coding", Video Compression Overview, Mar. 2012, 171 pp.

Nicolas, H., et al.; "Region-based motion estimation using deterministic relaxation schemes for image sequence coding", IEEE 1992, 4 pp.

Nokia, Inc., Nokia Research Center, "MVC Decoder Description", Telecommunication Standardization Sector, Study Period 1997-2000, Geneva, Feb. 7, 2000, 99 pp.

Orchard, Michael T.; "Exploiting Scene Structure in Video Coding", IEEE 1991, 5 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Overview; VP7 Data Format and Decoder. Version 1.5. On2 Technologies, Inc. Dated Mar. 28, 2005.

Schiller, H., et al.; "Efficient Coding of Side Information in a Low Bitrate Hybrid Image Coder", Signal Processing 19 (1990) Elsevier Science Publishers B.V. 61-73, 13 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Seiler, et al., "Spatio-Temporal Prediction in Video Coding by Spatially Refined Motion Compensation," ICIP, 2008, pp. 2788-2791.

Series H: Audiovisual and Multimedia Systems, Infrastructure of audiovisual services—Coding of moving video, Video coding for low bit rate communication, International Telecommunciation Union, ITU-T Recommendation H.263, Feb. 1998, 167 pp.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video

(56) References Cited

OTHER PUBLICATIONS coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
WebM Project, WebM Video Hardware RTLs, http://www.webmproject.org/hardware/, 3 pp, (Jun. 27, 2012).
Wiegand, Thomas, et al.; "Long-Term Memory Motion-Compensated Prediction", Publication Unknown, Date Unknown, 15 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wikipedia, the free encyclopedia, "Application-specific integrated circuit", http://en.wikipedia.org/wiki/Application-specific_integrated_circuit, 7 pp (Jun. 27, 2012).
Xiao, "Macroblock Level Hybrid Temporal-Spatial Prediction for H.264/AVC," Circuits and Systems (ISCAS), Proceedings of 2010 IEEE International Symposium, Paris, 4 pages.

SPATIAL BLOCK MERGE MODE

CROSS REFERENCE TO RELATED APPLICATIONS

The present application claims priority to U.S. Provisional App. No. 61/433,004 for "Spatial Block Merge Mode" filed Jan. 14, 2011, the contents of which is incorporated herein by reference in their entirety.

The present application is related to U.S. patent application Ser. No. 13/351,682 for "Temporal Block Merge Mode" filed Jan. 17, 2012, and U.S. Provisional App. No 61/433,010, for "Joint Spatial and Temporal Merge Mode for HEVC Temporal Block Merge Mode" filed concurrently, the contents of which are incorporated herein by reference in their entirety.

BACKGROUND

Particular embodiments generally relate to video compression.

In video sequences, a great degree of redundancy may exist. That is, within a very short period of time, the shape(s) of foreground object(s) and the background within a picture may not vary very much, and pixels in the foreground objects may move along a similar nature. In object-based video coding, different parts of a picture can be coded and transmitted separately as video objects. Motion information of different pixels in the same object should be the same in some cases. However, many bits still need to be used to describe the arbitrary object shape, which reduces coding efficiency. Thus, the efficient representation of object motion is challenging.

High efficiency video coding (HEVC) is a block-based hybrid spatial and temporal predictive coding scheme. HEVC partitions an input picture into square blocks referred to as largest coding units (LCUs) that could be a size up to 64×64. Theoretically, a larger coding unit is preferred to take advantage of correlation among immediate neighboring pixels. Each LCU can be partitioned into smaller square blocks called coding units (CUs). FIG. 1A shows an example of an LCU partition of CUs. An LCU 100 is first partitioned into four CUs 102. Each CU 102 may also be further split into four smaller CUs 102 that are a quarter of the size of the CU 102. This partitioning process can be repeated based on certain criteria, such as limits to the number of times a CU can be partitioned may be imposed. As shown, CUs 102-1, 102-3, and 102-4 are a quarter of the size of LCU 100. Further, a CU 102-2 has been split into four CUs 102-5, 102-6, 102-7, and 102-8.

To allow for flexible motion representation and higher coding efficiency, a quadtree data representation is used to describe how LCU 100 is partitioned into CUs 102. FIG. 1B shows a quadtree 104 of the LCU partition shown in FIG. 1A. Each node of quadtree 104 is assigned a flag of "1" if the node is further split into four sub-nodes and assigned a flag of "0" if the node is not split. The flag is called a split bit (e.g. 1) or stop bit (e.g., 0) and is coded in a compressed bitstream.

A node 106-1 includes a flag "1" at a top CU level because LCU 100 is split into 4 CUs. At an intermediate CU level, the flags indicate whether a CU 102 is further split into four CUs. In this case, a node 106-3 includes a flag of "1" because CU 102-2 has been split into four CUs 102-5-102-8. Nodes 106-2, 106-4, and 106-5 include a flag of "0" because these CUs 102 are not split. Nodes 106-6, 106-7, 106-8, and 106-9 are at a bottom CU level and hence, no flag bit of "0" or '1" is necessary for those nodes because corresponding CUs 102-5-102-8 are not split. The partitioning process may continue all the way to 4×4 blocks. The quadtree data representation for quadtree 104 shown in FIG. 1B may be represented by the binary data of "10100", where each bit represents a node 106 of quadtree 104. The binary data indicates the LCU partitioning to the encoder and decoder, and this binary data needs to be coded and transmitted as overhead.

Each CU 102 may include one or more prediction units (PUs). The PUs may be used to perform spatial prediction or temporal prediction. FIG. 2 shows an example of a CU partition of PUs 202. As shown, a CU 102 has been partitioned into four PUs 202-1-202-4. Spatial or temporal prediction coding may be performed over each PU 202. In inter-mode, motion parameters are coded and transmitted for each PU. The structure may require many bits for motion information, especially for irregularly shaped objects.

A spatial merge mode may be used to improve coding efficiency. The spatial merge mode may merge a current block with its neighboring block(s) to form a "region". All the pixels within the region share the same motion parameters. Thus, there is no need to code and transmit motion parameters for each individual block of a region. Instead, for a region, only one set of motion parameters is coded and transmitted. The current block is allowed to merge with a spatially-located block that is neighboring the current block to the left or the top. An indicator is used to specify whether the current block is merged with an available neighboring block, either the left neighboring block or the top neighboring block should be used in the spatial merge. The spatial merge mode is limited to merging with spatially-located blocks in the same frame.

SUMMARY

The following detailed description and accompanying drawings provide a more detailed understanding of the nature and advantages of the present invention.

An embodiment includes a method comprising determining one or more neighboring blocks spatially located with a current block of video content to form a merge mode for the current block, selecting motion parameters of the one or more neighboring blocks for encoding the current block, encoding the current block using the selected motion parameters; and transmitting information to a decoder to indicate which motion parameters from the one or more selected neighboring blocks to use in decoding the current block, wherein the merged block will share the same motion parameters as the selected neighboring block, and wherein no bits, flags or indexes are used to indicate the merge mode.

An embodiment includes an apparatus comprising one or more computer processors, and a computer-readable storage medium comprising instructions for controlling the one or more computer processors to be operable to determine one or more neighboring blocks spatially located with a current block of video content to form a merge mode for the current block, select motion parameters of the one or more neighboring blocks for encoding the current block, and signal information to a decoder to indicate which motion parameters from a candidate block on the merge mode candidate list to use in decoding the current block, wherein no bits, flags or indexes are used to indicate the merge mode.

An embodiment includes a method comprising determining a merge mode for a current block of video content, wherein the merge mode is selected from a candidate list comprising neighboring blocks spatially located with the current block, determining the merge mode by analyzing the motion vector differences between the neighboring spatial blocks, selecting one or more blocks for encoding the current block, encoding the current block using the motion parameters of the selected one or more selected blocks, and transmitting information to a decoder to indicate which motion parameters from the one or more selected blocks to use in decoding the current block, wherein the merged block will share the same motion parameters as the selected block, and wherein no bits, flags or indexes are used to indicate the merge mode.

In one embodiment, the candidate list comprises top spatially-located block B, left spatially-located block A, top-left diagonally spatially-located block C, top-right diagonally spatially-located block D, and current block x. In one embodiment. analyzing the motion vector differences comprises assigning, $MV_A$, $MV_B$, $MV_C$, $MV_D$ as motion vectors (MVs) of spatial neighbors A, B, C, and D and assigning refIdx$_A$, refIdx$_B$, refIdx$_C$, refIdx$_D$ as reference pictures pointed by $MV_A$, $MV_B$, $MV_C$, $MV_D$ individually.

On embodiment includes scaling $MV_A$, $MV_B$, $MV_C$ and, $MV_D$ to the same reference picture. Analyzing the motion vector differences can additionally comprise calculating spatial MV differences between, $MV_A$ and, $MV_D$ and between $MV_B$ and $MV_C$. The method of claim 1, can additionally comprises comparing the norm of $\Delta MV_{AD}$ to the norm of $\Delta MV_{BC}$.

In one embodiment, the encoding comprises merging block X with the top block B, if the norm of $\Delta MV_{AD}$ is smaller than or equal to the norm of $\Delta MV_{BD}$, wherein blocks X and B will share the same, $MV_B$ and refIdx$_B$. In one embodiment, the encoding comprises merging block X with the with the left block A if the norm of $\Delta MV_{AD}$ is greater than the norm of $\Delta MV_{BD}$, wherein the blocks X and A will share the same, $MV_A$ and refIdx$_A$.

Another embodiment includes a method comprising receiving a merge mode for a current block of video content, wherein the merge mode is selected from a candidate list, wherein the candidate list comprises neighboring blocks that are spatially located with the current block; and determining which candidate block is identified in the merge mode candidate list for decoding a current block of video content, wherein no bits, flags or indexes are used to indicate the merge mode.

One embodiment includes an apparatus comprising: one or more computer processors; and a computer-readable storage medium comprising instructions for controlling the one or more computer processors to be operable to: determine motion parameters for at least one spatially-located block to a current block of video content, the spatially-located block located in the same picture from the current block; identify the at least one spatially-located block in a merge mode candidate list, the merge mode candidate list including candidate blocks in which motion parameters are candidates to be used for the current block; and signal information to a decoder to indicate which motion parameters from a candidate block on the merge mode candidate list to use in decoding the current block, wherein no bits, flags or indexes are used to indicate the merge mode.

In one embodiment the apparatus is further operable to: determine motion parameters for at least one spatially-located block to the current block of video content, the at least one spatially-located block located in a same picture as the current block; and identify the at least one spatially-located block in the merge mode candidate list. The signal can comprise a set of rules at an encoder to allow the decoder to determine which motion parameters from the candidate block on the merge mode candidate list to use.

Yet another embodiment comprises an apparatus comprising one or more computer processors; and a computer-readable storage medium comprising instructions for controlling the one or more computer processors to be operable to: receive signaling including a merge mode candidate list, the merge mode candidate list identifying candidate blocks in which motion parameters are candidates to be used for the current block; determine which candidate block is identified in the merge mode candidate list for decoding a current block of video content; and use motion parameters for the spatially-located block in decoding the current block of video content, the spatially-located block located in the same picture as the current block, wherein no bits, flags or indexes are used to indicate the merge mode. The merge mode candidate list can include at least one spatially-located block to the current block, the at least one spatially-located block located in a same picture as the current block, and if the at least one spatially-located block is identified in the candidate list for decoding the current block, further operable to: use motion parameters for the at least one spatially-located block in decoding the current block of video content. The apparatus can also follow a set of rules to determine which merge mode to use to determine which motion parameters from the candidate block to use in decoding the current block.

DETAILED DESCRIPTION

Described herein are techniques for a video compression system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1A:
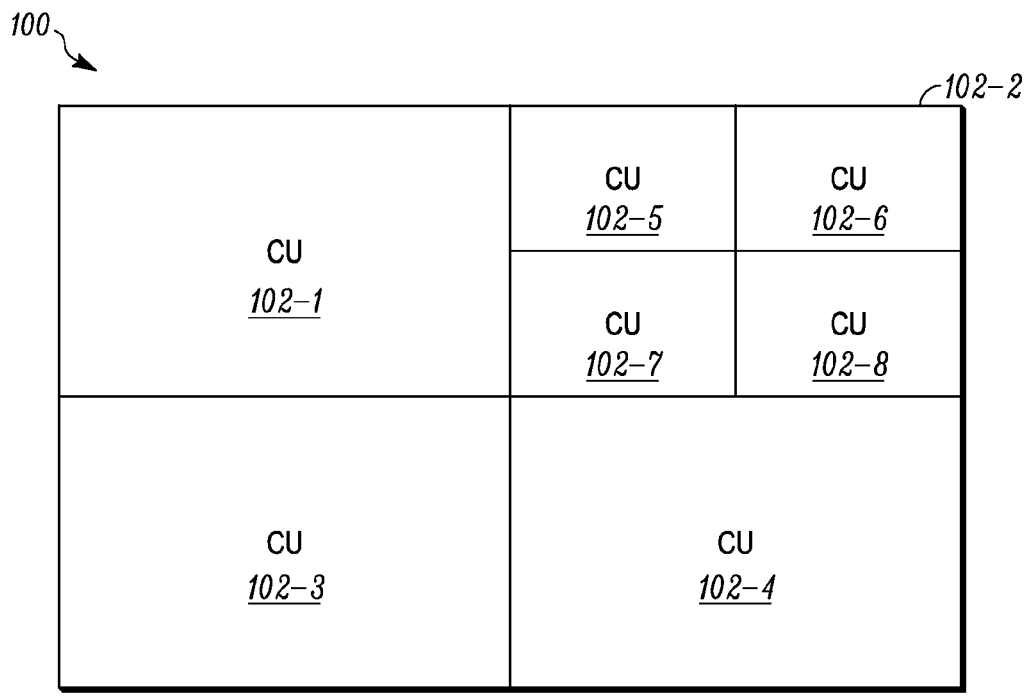
FIG. 1A shows an example of an LCU partition.
Figure 1B:
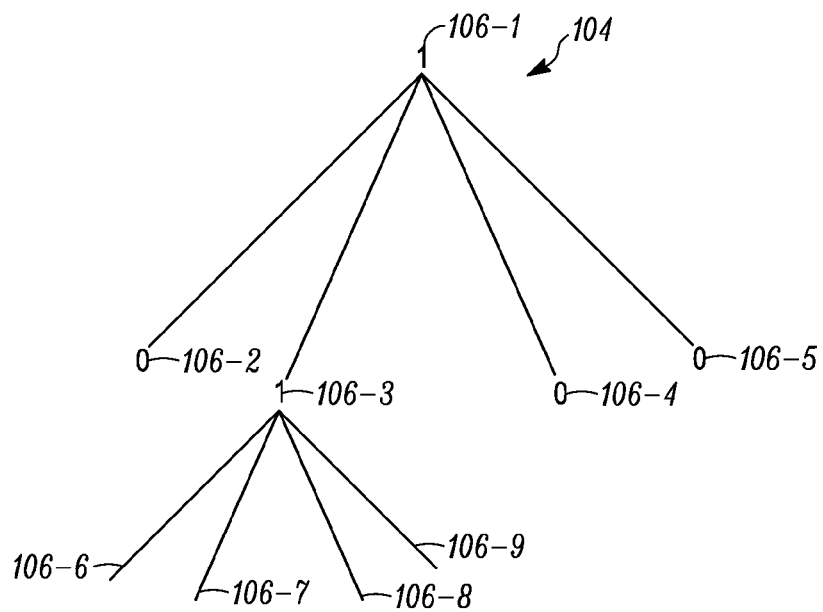
FIG. 1B shows a quadtree of the LCU partition shown in FIG. 1A.
Figure 2:
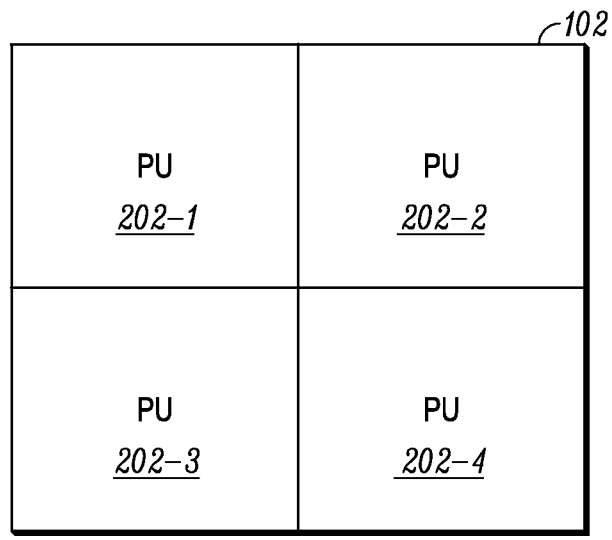
FIG. 2 shows an example of a CU partition of PUs
Figure 3:
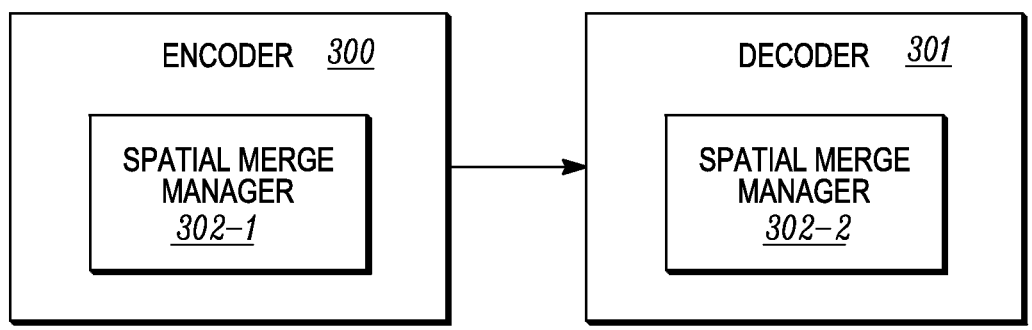
FIG. 3 depicts an example of a system for encoding and decoding video content according to one embodiment.

FIG. 3 depicts an example of a system for encoding and decoding video content according to one embodiment. The system includes an encoder 300 and a decoder 301, both of which will be described in more detail below. Encoder 300 uses a spatial merge manager 302-1 in an encoding process and decoder 301 uses a spatial-merge manager 302-2 in a decoding process. In one embodiment, encoder 300 and decoder 301 use the HEVC coding scheme.

Each spatial merge manager 302 allows spatial correlation to be taken into consideration for spatially-located blocks while in a merge mode. That is, given a current block in the merge mode, spatially-located blocks may be used (i.e., a spatial merge mode) in a merge with the current block. For example, the left and top neighboring blocks may be used as spatially-located blocks may be used. Motion parameters of the current block may be derived from the spatially-located blocks and used in the spatial merge.

Spatial merge mode may merge a current block with the spatially-located block to form a "region". All the pixels within the region share the same motion parameters. Thus, there is no need to code and transmit motion parameters for each individual block of a region. Instead, for a region, only one set of motion parameters is coded and transmitted.

In addition, a current block may conceptually merge with more than one spatially-located block and use the motion parameters of more than one spatially-located block(s) to form its own motion parameters. For example, the current block may conceptually merge with two different spatially-located blocks, and use the motion parameters from the two different spatially-located blocks to form the motion parameters in spatial merge.

In addition to the motion parameters for the spatially-located blocks, motion parameters may be determined by combining motion parameters from spatially-located blocks. For example, two different sets of motion parameters may be determined from different spatially-located blocks. The motion parameters, including motion vectors, may be scaled according to the temporal difference between the reference picture and the current picture. Motion parameters are motion vectors plus reference picture indices. Reference picture indices are used to indicate which picture is used for reference. For the scaling process, this should be applied on motion vectors and may be scaled according to the temporal difference between the reference picture and the current picture. For example, block A is the current block in picture 3 and it needs to get a reference in picture 2. Block B is the upper block and its motion parameter points to a reference in picture 1. Due to the different reference pictures, the motion vector of block B needs to be scaled before applied to block A in merge mode.

The spatially-located blocks described above may be identified on a merge mode candidate list. For example, the left and top spatially-located blocks, and two combined blocks may be candidates to be merged with a current block. Particular embodiments provide signaling from spatial merge manager 302-1 to spatial merge manager 302-2 to indicate which motion parameters from a block to use in decoding the current block. Particular embodiments may not require providing signaling from spatial merge manager 302-1 to spatial merge manager 302-2 to indicate which merge mode to use. Currently in the art, for example, an index may be set and signaled to indicate which motion parameters are used. Also, flags may be set and signaled to indicate which motion parameters should be used in the coding process. However, actual signaling of which merge mode is preferred and which blocks are merged may not be performed as encoder 300 and decoder 301 separately determine which merge mode to use.

FIGS. 4-8 illustrate the various merging scenarios for spatial merging according to one embodiment. The motion vector parameters may be determined in different ways. Described herein are different ways of determining which merge mode to use.

Figure 4:
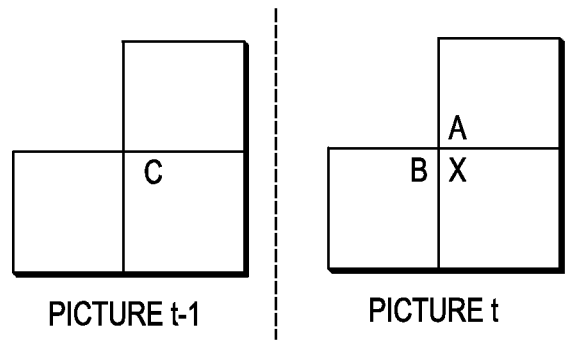
FIG. 4 depicts spatial neighboring blocks according to one embodiment.

FIG. 4 depicts spatial neighboring blocks according to one embodiment. In a frame t, a current block is a block X. Current block X is allowed to spatially merge with a left neighboring block, block B, or a top neighboring block, a block A.

Figure 5:
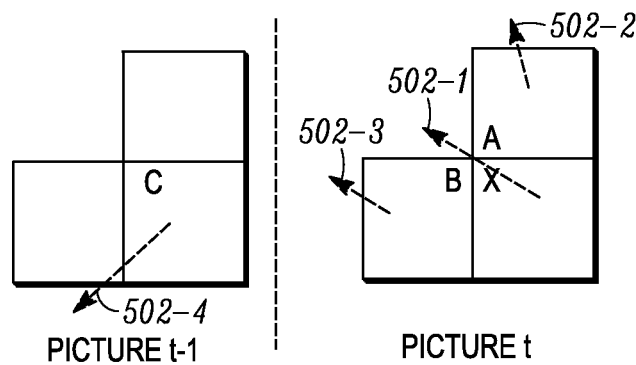
FIG. 5 depicts a scenario when block X is not in any merge mode according to one embodiment.

FIG. 5, for reference purposes, depicts a scenario when block X is not in any merge mode according to one embodiment. Motion vectors 502-1, 502-2, and 502-3 are shown for blocks in frame t. In this case, the motion parameters, such as the motion vector, need to be coded. Additionally, the motion parameters may include a reference picture index indicating which reference picture is used for prediction. In such embodiments, the actual motion parameters are sent from encoder 300 to decoder 301 in this case.

Figure 6:
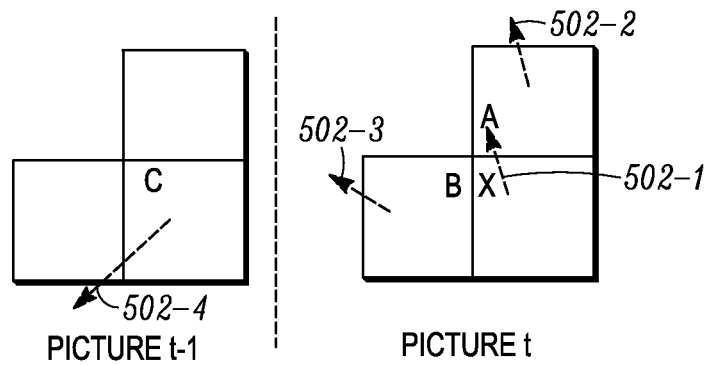
FIG. 6 depicts a scenario when block X is merged with block A in the spatial merge mode according to one embodiment.

FIG. 6 depicts a scenario when block X is merged with block A in the spatial merge mode according to one embodiment. In this case, motion vector 502-1 for block X is the same as motion vector 502-2. Block X is thus spatially merged with block A, which is the top neighboring block. Motion parameters for motion vector 502-1 only need to be coded once in this example for block X and block A. As will be discussed below, certain calculations will determine that block X is merged with block A.

Figure 7:
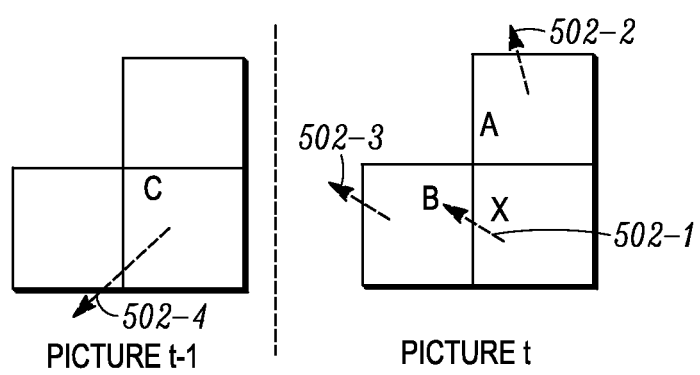
FIG. 7 depicts a scenario when block X is merged with block B in the spatial merge mode according to one embodiment.

FIG. 7 depicts a scenario when block X is merged with block B in the spatial merge mode according to one embodiment. Block B is the left neighboring block to block X, and motion vector 502-1 is the same as motion vector 502-3 for block B. Motion parameters only need to be coded once in this example for block X and block B. That is, the same motion parameters used for block B, such as motion vector 502-3, are used to for block X.

Known methods use different ways of indicating which merge mode to use. In one embodiment, an index may be used. Also, flags may be used. In all these cases, the use of two-three extra bits must be used to communicate the signal.

The advantage of merge mode is the saving of motion information for block X. However, in current methods known in the art, one extra bit is required for a current block to indicate if the current block is in merge mode, or not, for example, through the use of flags. Using an embodiment utilizing flags, if the current block is in merge mode, for example merge_flag is set to 1, one additional bit is required to indicate if the current block is merged with its left or top coded neighboring block if the left and top coded neighboring blocks have different motion information. In one embodiment, a flag can be used, for example, merge_left_flag to signal such scenarios.

Therefore, when the use of merge mode is present, it adds one or two additional bits per block. This one or two bits per block can be costly, especially at low bit-rates.

Described herein is a way to save one bit per block. Instead of sending the bit to signal if the current block is merged with its top or left neighboring block, the merging direction is derived based upon the motion information of the coded neighboring blocks.

Accordingly, described herein, are systems and methods to implement spatial merge mode, but also save the bit required to indicate whether a current block is merged spatially and the bit required to indicate whether a current block is merged with its left or top neighboring block. Specifically, given a current block in merge mode, merging direction is dependent upon motion information of the neighboring blocks.

Figure 8:
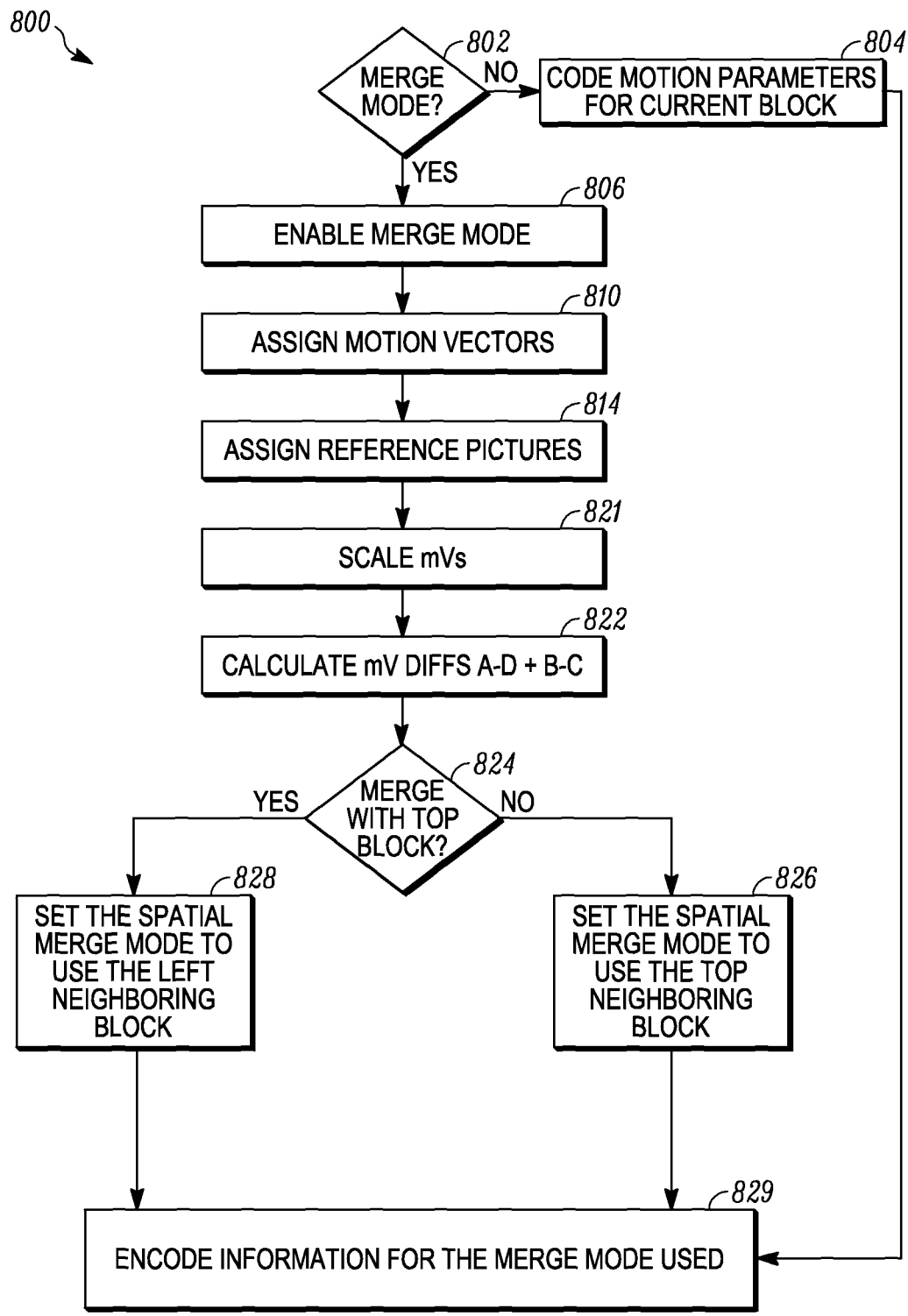
FIG. 8 depicts a simplified flowchart of a method for determining which mode to use in an encoding process according to one embodiment.

Particular embodiments use different ways of indicating which block to use from the candidate list. FIG. 8 depicts a simplified flowchart of a method for determining which mode to use in an encoding process according to one embodiment. At 802, spatial merge manager 302-1 determines if a current block X should be in a merge mode. If not, at 804, motion parameters for block X are coded. This may be the normal coding process for block X. Either flags, indexes or some other mechanism is used to indicate that merge mode is not enabled.

If a merge mode is selected, at 806, spatial merge manager 302-1 enables the merge mode. For example, spatial merge manager 302-1 sets an index, flag, bit or some other indicator to indicate that the merge mode is enabled.

At block 810, let $MV_A$, $MV_B$, $MV_C$, $MV_D$ be the MV of the spatial neighbors A, B, C, and D, per reference list individually.

At block 814 also let $refIdx_A$, $refIdx_B$, $refIdx_C$, $refIdx_D$ be the reference pictures pointed by $MV_A$, $MV_B$, $MV_C$, $MV_D$, individually, per reference list.

As previously mentioned, the current block X is in merge mode. Possible actions include being spatially merged with either block A or block B.

Instead of sending bits, flags, indexing or some other signaling, specifically, given a current block in merge mode, merging direction is determined dependent upon motion information to the neighboring blocks. This is explained in more detail, below.

A current block X has four spatially coded neighbors, A, B, C and D in the current picture. There may be one, two, or more reference lists available for the current block X.

The merging direction of block X per reference list is determined as follows:

At block 821 Scale $MV_A$, $MV_B$, $MV_C$, $MV_D$, to the same referenced picture, that is, $$\begin{cases} MV_A = \text{scale}(MV_A) \\ MV_B = \text{scale}(MV_B) \\ MV_C = \text{scale}(MV_C) \\ MV_D = \text{scacle}(MV_D) \end{cases}$$

At block 822, the spatial MV differences between $MV_A$ and $MV_D$ and between $MV_B$ and $MV_C$ are calculated, as $$\Delta MV_{AD} = MV_A - MV_D \text{ and } \Delta MV_{BC} = MV_{BC} - MV_C.$$

At 824, the calculation is norm of $\Delta MV_{AD}$ smaller than or equal to the norm of $\Delta MV_{BC}$, that is, $\|\Delta MV_{AD}\| \leq \|\Delta MV_{BC}\|$ is performed If yes, at 826 block X is merged with the top block B, implying blocks X and B will share the same $MV_B$ and $refIdx_B$, Otherwise, at 828 block X is merged with the left block A, implying blocks X and A will share the same $MV_A$ and $refIdx_A$.

At 829, spatial merge manager 302-1 has determined and can store information indicating the motion parameters used. Encoder 300 also encodes the motion parameters for the merged region at least once. Each block in the merged region use the same motion parameters so sending the motion parameters for each block in the region is avoided, which reduces overhead.

Figure 9:
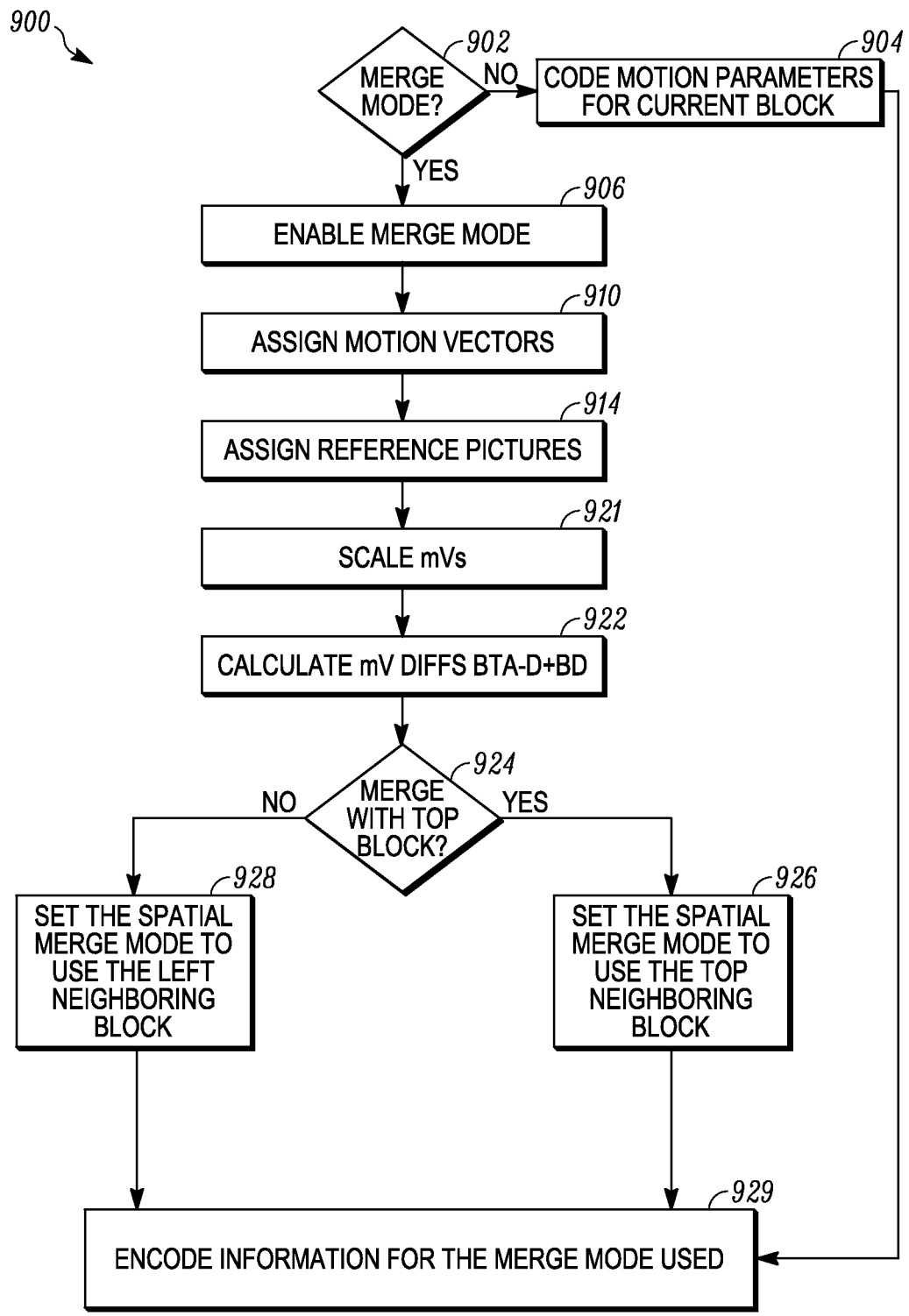
FIG. 9 depicts a simplified flowchart of an alternate embodiment for a method for determining which mode to use in an encoding process according to one embodiment.

An alternative embodiment is as follows in FIG. 9.

At 902, spatial merge manager 302-1 determines if a current block X should be in a merge mode. If not, at 904, motion parameters for block X are coded. This may be the normal coding process for block X. Either flags, indexes or some other mechanism is used to indicate that merge mode is not enabled.

If a merge mode is selected, at 906, spatial merge manager 302-1 enables the merge mode. For example, spatial merge manager 302-1 sets an index, flag, bit or some other indicator to indicate that the merge mode is enabled.

At block 910, let $MV_A$, $MV_B$, $MV_C$, $MV_D$ be the MV of the spatial neighbors A, B, C, and D, per reference list individually.

At block 914 also let $refIdx_A$, $refIdx_B$, $refIdx_C$, $refIdx_D$ be the reference pictures pointed by $MV_A$, $MV_B$, $MV_C$, $MV_D$, individually, per reference list.

Instead of sending bits, flags, indexing or some other signaling, specifically, given a current block in merge mode, merging direction is determined dependent upon motion information to the neighboring blocks. This is explained in more detail, below.

The merging direction of block X per reference list is determined as follows:

At block 921, scale $MV_A$, $MV_B$, $MV_C$, and $MV_D$ to the same reference picture, that is, $$\begin{cases} MV_A = \text{scale}(MV_A) \\ MV_B = \text{scale}(MV_B) \\ MV_C = \text{scale}(MV_C) \\ MV_D = \text{scale}(MV_D) \end{cases}$$

At block 922, calculate the differences between $MV_A$ and $MV_D$, and between $MV_B$ and $MV_D$, as $\Delta MV_{AD} = MV_A - MV_D$ and $\Delta MV_{BD} = MV_B - MV_D$.

At 924, the calculation is norm of $\Delta MV_{AD}$ smaller than or equal to the norm of $\Delta MV_{BD}$, that is, $\|\Delta MV_{AD}\| \leq \|\Delta MV_{BD}\|$ is performed.

If yes, at 926 block X is merged with the top block B, implying blocks X and B will share the same $MV_B$ and $refIdx_B$, Otherwise, at 928 block X is merged with the left block A, implying blocks X and A will share the same $MV_A$ and $refIdx_A$.

At 929, spatial merge manager 302-1 has determined and can store information indicating the motion parameters used. Encoder 300 also encodes the motion parameters for the merged region at least once. Each block in the merged region use the same motion parameters so sending the motion parameters for each block in the region is avoided, which reduces overhead.

The same reference picture mentioned above can be, for example, the reference pointed by either $MV_A$ or $MV_B$, whichever has a smaller nonnegative $refIdx_x$.

There may be one, two or more derived MV(s) for the current block, depending upon the number of reference lists available for the current block.

Since blocks A, B, C, and D are coded block for the current block X, their MV(s) are available for both encoder and decoder. Hence, no bit is required to indicate which neighbor block's MV(s) are used for a block in merging mode. If A, B, C, or D is not available or in intra mode, the associated MV(s) are set to be (0,0) and refIdx to −1.

Figure 10:
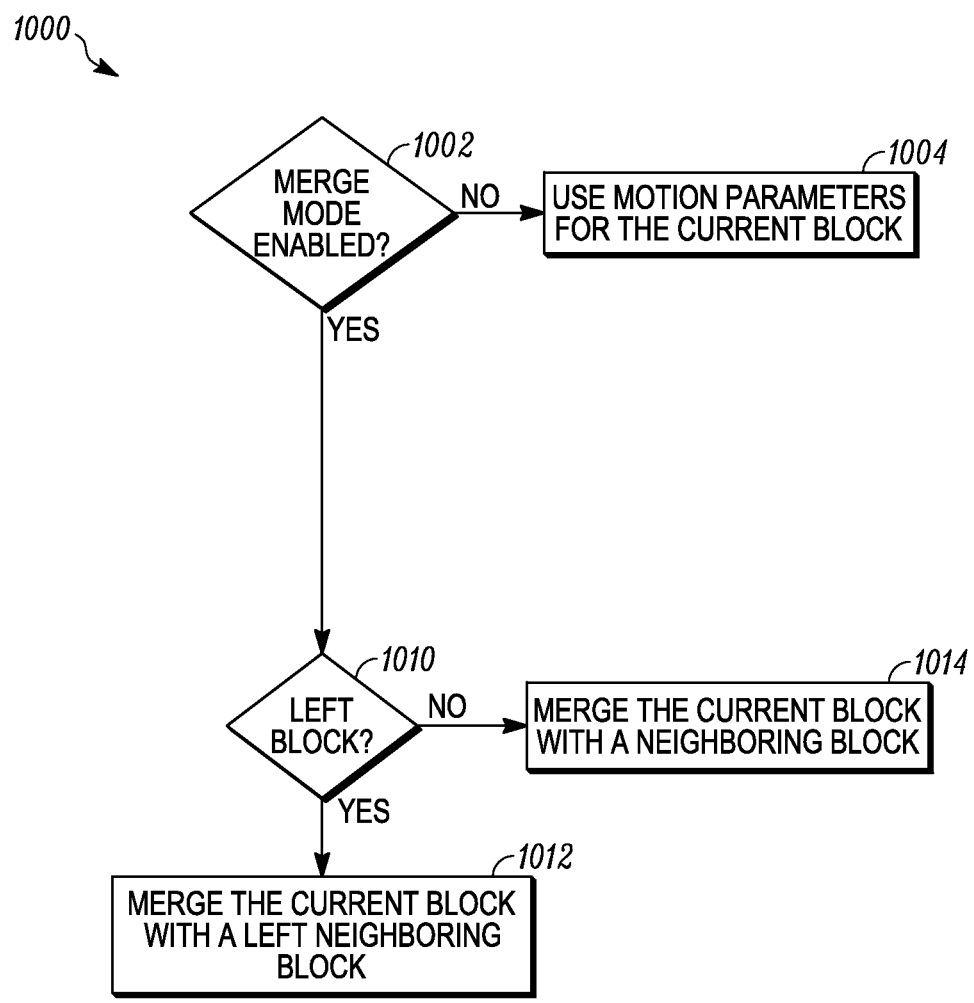
FIG. 10 depicts a simplified flowchart of a method for decoding for a current block according to one embodiment.

FIG. 10 depicts a simplified flowchart 1000 of a method for decoding for a current block according to one embodiment. At 1002, spatial merge manager 302-2 determines if the merge mode is enabled for a current block X. For example, spatial merge manager 302-2 determines if the flag merge_flag is set to a value of "0" to indicate that current block X is not in any merge mode or to a value of "1" to indicate that the current block X is in the merge mode. If the merge mode is not enabled, at 1004, then motion parameters for block X are determined and used in motion prediction at decoder 301. In another embodiment, information in an index is used to determine if the merge mode is or is not enabled.

At block 1010, $MV_A$, $MV_B$, $MV_C$, $MV_D$ are set to the MV of the spatial neighbors A, B, C, and D, per reference list individually.

At blocks 1014 and 1016, $refIdx_A$, $refIdx_B$, $refIdx_C$, $refIdx_D$, are set to the reference pictures pointed by $MV_A$, $MV_B$, $MV_C$, and $MV_D$, individually.

As in the encoder, instead of receiving bits, flags, indexing or some other signaling, specifically, given a current block in merge mode, merging direction is determined dependent upon motion information to the neighboring blocks. This is explained in more detail, below.

Again, the merging direction of block X per reference list is determined as follows:

Scale $MV_A$, $MV_B$, $MV_C$, and $MV_D$ to the same reference picture, that is, $$\begin{cases} MV_A = \text{scale}(MV_A) \\ MV_B = \text{scale}(MV_B) \\ MV_C = \text{scale}(MV_C) \\ MV_D = \text{scale}(MV_D) \end{cases}$$

Calculate the differences between $MV_A$ and $MV_D$, and between $MV_B$ and $MV_C$, as $\Delta MV_{AD} = MV_A - MV_D$ and $\Delta MV_{BC} = MV_B - MV_C$.

If the norm of $\Delta MV_{AD}$ is smaller than or equal to the norm of $\Delta MV_{BC}$, that is, $\|\Delta MV_{AD}\| \le \|\Delta MV_{BC}\|$, block X is merged with the top block B, implying blocks X and B will share the same $MV_B$ and $refIdx_B$, Otherwise, block X is merged with the left block A, implying blocks X and A will share the same $MV_A$ and $refIdx_A$.

Figure 11:
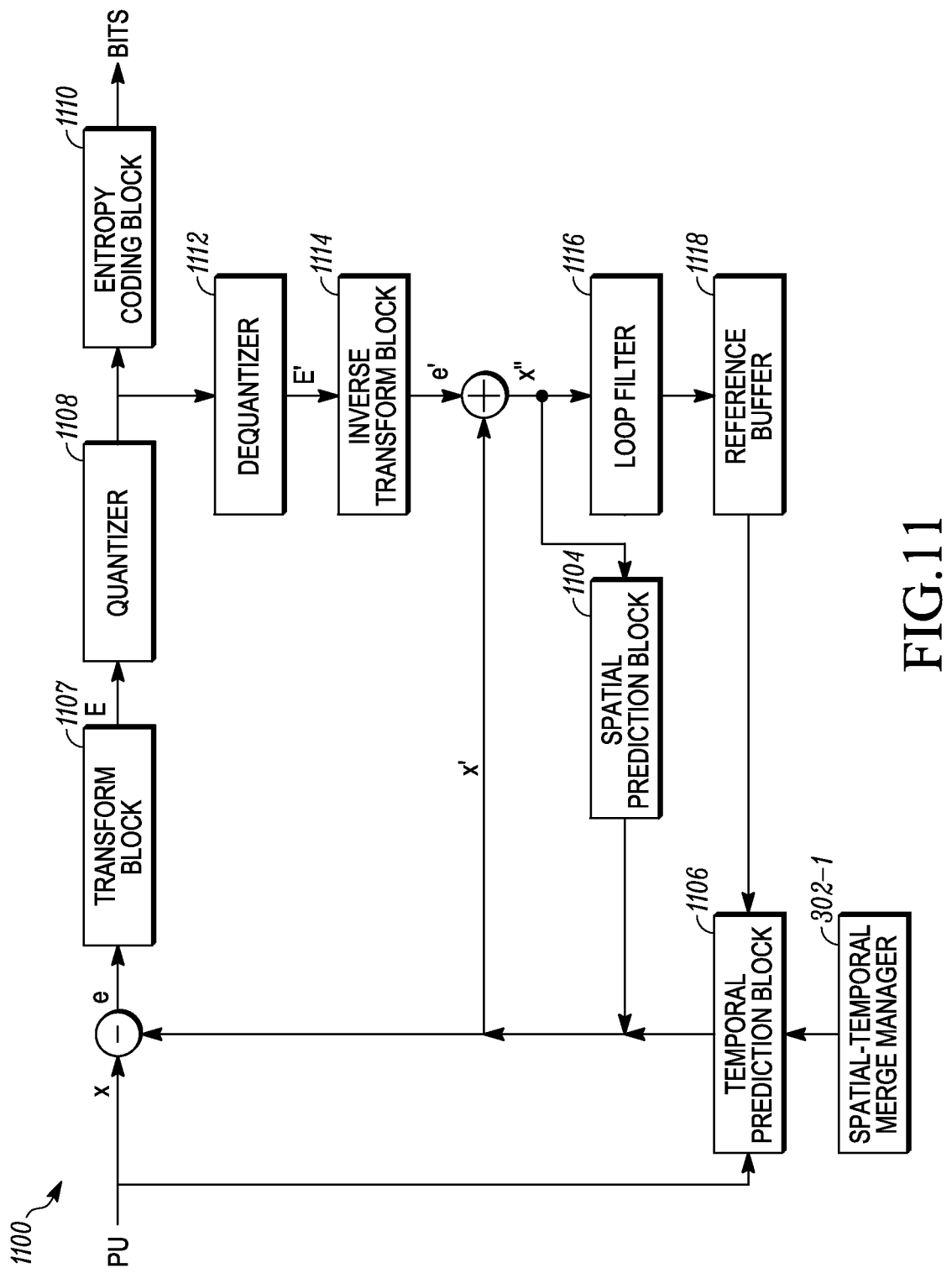
FIG. 11 depicts an example of an encoder according to one embodiment.

FIG. 11 depicts an example of an encoder 300 according to one embodiment. A general operation of encoder 300 will now be described. It will be understood that variations on the encoding process described will be appreciated by a person skilled in the art based on the disclosure and teachings herein.

For a current PU, x, a prediction PU, x', can be obtained through either spatial prediction or temporal prediction. In the embodiments herein, only spatial prediction is contemplated. The prediction PU is then subtracted from the current PU, resulting in a residual PU, e. A spatial prediction block 1104 may include different spatial prediction directions per PU, such as horizontal, vertical, 45-degree diagonal, 135-degree diagonal, DC (flat averaging), and planar.

If utilized, a temporal prediction block 1106 performs temporal prediction through a motion estimation and motion compensation operation. The motion estimation operation searches for a best match prediction for the current PU over reference pictures. The best match prediction is described by a motion vector (MV) and associated reference picture (refIdx). The motion vector and associated reference picture are included in the coded bit stream. In motion compensation, a best match prediction for the current PU is determined using the MV and refIdx.

Spatial merge manager 302-1 may communicate with a temporal prediction block 306 to perform motion prediction for a current PU. If the current block is merged with a spatially-located block or a temporally-located block, spatial-temporal merge manager 302 may signal information indicating which block should be used in the decoding the current block. Motion parameters for the current block do not need to be signaled again if the current block is merged spatially or temporally.

Transform block 1107 performs a transform operation with the residual PU, e. Transform block 1107 outputs the residual PU in a transform domain, E.

A quantizer 1108 then quantizes the transform coefficients of the residual PU, E. Quantizer 1108 converts the transform coefficients into a finite number of possible values. Entropy coding block 1110 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 300, a de-quantizer 1112 de-quantizes the quantized transform coefficients of the residual PU. De-quantizer 1112 then outputs the de-quantized transform coefficients, E'. An inverse transform block 1114 receives the de-quantized transform coefficients, which are then inverse transformed resulting in a reconstructed residual PU, e'. The reconstructed PU, e', is then added to the corresponding prediction, x', either spatial or temporal, to form the new reconstructed PU, x". A loop filter 1116 performs de-blocking on the reconstructed PU, x", to reduce blocking artifacts. Additionally, loop filter 1116 may perform a sample adaptive offset process after the completion of the de-blocking filter process for the decoded picture, which compensates for a pixel value offset between reconstructed pixels and original pixels. Also, loop filter 1116 may perform adaptive filtering over the reconstructed PU, which minimizes coding distortion between the input and output pictures. Additionally, if the reconstructed pictures are reference pictures, the reference pictures are stored in a reference buffer 1118 for future temporal prediction.

Figure 12:
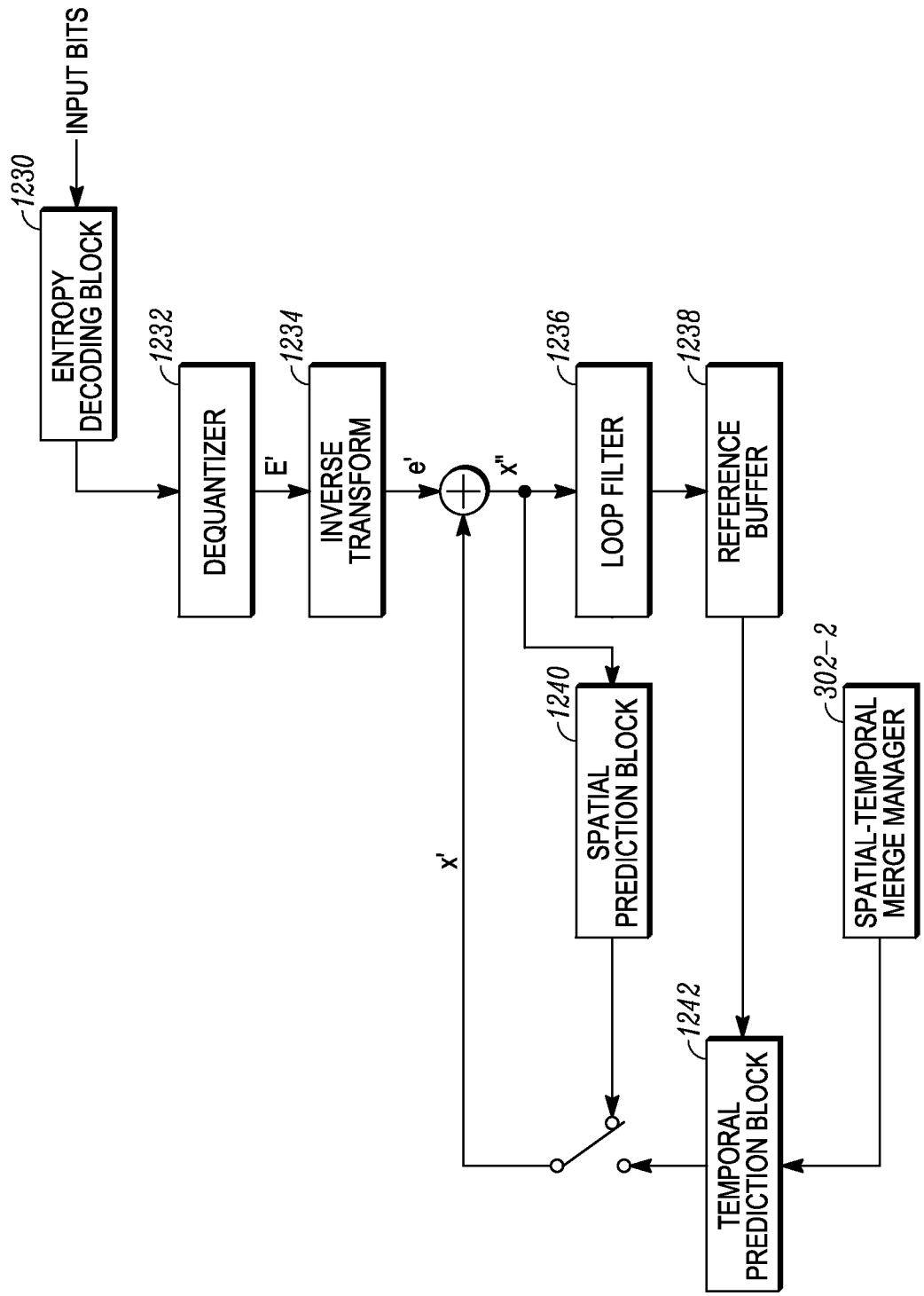
FIG. 12 depicts an example of a decoder according to one embodiment.

FIG. 12 depicts an example of decoder 301 according to one embodiment. A general operation of decoder 301 will now be described. It will be understood that variations on the decoding process described will be appreciated by a person skilled in the art based on the disclosure and teachings herein. Decoder 301 receives input bits from encoder 300 for compressed video content.

An entropy decoding block 1230 performs entropy decoding on input bits corresponding to quantized transform coefficients of a residual PU. A de-quantizer 1232 de-quantizes the quantized transform coefficients of the residual PU. De-quantizer 1232 then outputs the de-quantized transform coefficients of the residual PU, E'. An inverse transform block 1234 receives the de-quantized transform coefficients, which are then inverse transformed resulting in a reconstructed residual PU, e'.

The reconstructed PU, e', is then added to the corresponding prediction, x', either spatial or temporal, to form the new constructed PU, x". A loop filter 1236 performs de-blocking on the reconstructed PU, x", to reduce blocking artifacts. Additionally, loop filter 1236 may perform a sample adaptive offset process after the completion of the de-blocking filter process for the decoded picture, which compensates for a pixel value offset between reconstructed pixels and original pixels. Also, loop filter 1236 may perform an adaptive loop filter over the reconstructed PU, which minimizes coding distortion between the input and output pictures. Additionally, if the reconstructed pictures are reference pictures, the reference pictures are stored in a reference buffer 1238 for future temporal prediction.

The prediction PU, x', is obtained through either spatial prediction or temporal prediction. A spatial prediction block 1240 may receive decoded spatial prediction directions per PU, such as horizontal, vertical, 45-degree diagonal, 135-degree diagonal, DC (flat averaging), and planar. The spatial prediction directions are used to determine the prediction PU, x'.

If utilized, temporal prediction block 1242 performs temporal prediction through a motion estimation and motion compensation operation. A decoded motion vector or a motion vector derived from other motion information is then used to determine the prediction PU, x'. Temporal prediction is not contemplated in the embodiment disclosed herein.

Spatial merge manager 302-2 receives signaling from spatial merge manager 302-1 indicating the motion parameters to use for the current PU. Spatial merge manager 302-2 may communicate with temporal prediction block 1242 to indicate whether the current PU should use motion parameters for a spatially-located block or a temporally-located block. For example, a decoded motion vector may be used for a temporally-located block or a decoded motion vector may be used for a spatially-located block in a temporal prediction.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

The invention claimed is:

1. A method comprising:
   determining one or more neighboring blocks spatially located with a current block of video content to form a merge mode for the current block;
   analyzing the motion vector differences of the one or more neighboring blocks; selecting motion parameters of the one or more neighboring blocks for encoding the current block;
   encoding the current block using the selected motion parameters; and
   transmitting information to a decoder to indicate which motion parameters from the one or more selected neighboring blocks to use in decoding the current block, wherein the encoded current block will share the same motion parameters as the selected neighboring block, and
   wherein the merge mode information sending no bits, flags or indexes to indicate the selected neighboring block.

2. The method of claim 1, wherein analyzing the motion vector differences comprises assigning, $MV_A$, $MV_B$, $MV_C$, $MV_D$ as motion vectors (MVs) of spatial neighboring blocks A, B, C, and D.

3. The method of claim 2, wherein analyzing the motion vector differences comprises assigning reftdx$_A$, reftdx$_B$, reftdx$_C$, reftdx$_D$ as reference pictures pointed by $MV_A$, $MV_B$, $MV_C$, $MV_D$, individually.

4. The method of claim 3, wherein analyzing the motion vector differences additionally comprises scaling $MV_A$, $MV_B$, $MV_C$, $MV_D$ to the same reference picture.

5. The method of claim 2, wherein analyzing the motion vector differences additionally comprises calculating spatial MV differences between $MV_A$ and $MV_D$ and between $MV_B$ and $MV_C$.

6. The method of claim 2, wherein analyzing the motion vector differences additionally comprises comparing the norm of $\Delta MV_{AD}$ to the norm of $\Delta MV_{BC}$.

7. The method of claim 4, wherein the encoding comprises merging the current block with the top block B, if the norm of $\Delta MV_{AD}$ is smaller than or equal to the norm of $\Delta MV_{BC}$, wherein the current block and B will share the same $MV_B$ and reftdx$_B$.

8. The method of claim 4, wherein the encoding comprises merging the current block with the with the left block A if the norm of $\Delta MV_{AD}$ is greater than the norm of $\Delta MV_{BC}$, wherein the current block and A will share the same $MV_A$ and reftdx$_A$.

9. A method comprising:
   receiving a merge mode for a current block of video content, wherein the merge mode is selected from a candidate list, wherein the candidate list comprises neighboring blocks that are spatially located with the current block;
   analyzing the motion vector differences of the neighboring blocks; and
   determining which candidate block is identified in the merge mode candidate list for decoding a current block of video content,
   wherein the merge mode information sending no bits, flags or indexes to indicate the selected candidate block.

10. The method of claim 9, wherein analyzing the motion vector differences additionally comprises assigning, $MV_A$, $MV_B$, $MV_C$, $MV_D$ as motion vectors (MVs) of spatial neighbors A, B, C, and D, and assigning reftdx$_A$, reftdx$_B$, reftdx$_C$, reftdx$_D$ as reference pictures pointed by $MV_A$, $MV_B$, $MV_C$, $MV_D$, individually.

11. The method of claim 10, wherein analyzing the motion vector differences additionally comprises scaling $MV_A$, $MV_B$, $MV_C$, $MV_D$ to the same reference picture.

12. The method of claim 9, wherein analyzing the motion vector differences additionally comprises calculating spatial MV differences between $MV_A$ and $MV_D$ and between $MV_B$ and $MV_C$.

13. The method of claim 9, wherein analyzing the motion vector differences additionally comprises comparing the norm of $\Delta MV_{AD}$ to the norm of $\Delta MV_{BC}$.

14. The method of claim 13, wherein the encoding comprises merging the current block with the top block B, if the norm of $\Delta MV_{AD}$ is smaller than or equal to the norm of $\Delta MV_{BC}$, wherein the current block and B will share the same $MV_B$ and reftdx$_B$.

15. The method of claim 9, wherein the encoding comprises merging the current block with the with the left block A if the norm of $\Delta MV_{AD}$ is greater than the norm of $\Delta MV_{BC}$, wherein the current block and A will share the same $MV_A$ and reftdx$_A$.

16. The method of claim 9, wherein analyzing the motion vector differences additionally comprises calculating spatial MV differences between $MV_A$ and $MV_D$ and between $MV_B$ and $MV_D$.

17. The method of claim 9, wherein analyzing the motion vector differences additionally comprises comparing the norm of $\Delta MV_{AD}$ to the norm of $\Delta MV_{BD}$.

18. The method of claim 9, wherein the encoding comprises merging the current block with the top block B, if the norm of $\Delta MV_{AD}$ is smaller than or equal to the norm of $\Delta MV_{BD}$, wherein the current block and B will share the same $MV_B$ and reftdx$_B$.

19. The method of claim 9, wherein the encoding comprises merging the current block with the with the left block A if the norm of $\Delta MV_{AD}$ is greater than the norm of $\Delta MV_{BD}$, wherein the current block and A will share the same $MV_A$ and reftdx$_A$.

20. An apparatus comprising:
one or more computer processors; and
a computer-readable storage medium comprising instructions for controlling the one or more computer processors to be operable to:
determine one or more neighboring blocks spatially located with a current block of video content to form a merge mode for the current block;
analyze the motion vector differences of the one or more neighboring;
select motion parameters of the one or more neighboring blocks for encoding the current block; and
signal information to a decoder to indicate which motion parameters from a candidate block on the merge mode candidate list to use in decoding the current block, wherein the merge mode information sending no bits, flags or indexes are used to indicate the selected candidate block.

21. The apparatus of claim 20, further operable to:
determine motion parameters for at least one spatially-located neighboring block to the current block of video content, the at least one spatially-located block located in a same picture as the current block; and
identify the at least one spatially-located block in a merge mode candidate list.

22. The apparatus of claim 20, wherein the signal comprises a set of rules at an encoder to allow the decoder to determine which motion parameters from the candidate block on the merge mode candidate list to use.

23. An apparatus comprising:
one or more computer processors; and
a computer-readable storage medium comprising instructions for controlling the one or more computer processors to be operable to:
receive signaling including a merge mode candidate list, the merge mode candidate list identifying candidate blocks in which motion parameters are candidates to be used for the current block;
analyze the motion vector differences of the one or more neighboring;
determine which candidate block is identified in the merge mode candidate list for decoding a current block of video content; and
use motion parameters for the spatially-located block in decoding the current block of video content, the spatially-located block located in the same picture as the current block,
wherein the merge mode information sending no bits, flags or indexes are used to indicate the selected candidate block.

24. The apparatus of claim 23, wherein the merge mode candidate list includes at least one spatially-located block to the current block, the at least one spatially-located block located in a same picture as the current block, and if the at least one spatially-located block is identified in the candidate list for decoding the current block, further operable to:
use motion parameters for the at least one spatially-located block in decoding the current block of video content.

25. The apparatus of claim 23, wherein determine which candidate block comprises to follow a set of rules to determine which merge mode to use to determine which motion parameters from the candidate block to use in decoding the current block.

* * * * *

UNITED STATES PATENT AND TRADEMARK OFFICE
CERTIFICATE OF CORRECTION

PATENT NO. : 9,066,104 B2
APPLICATION NO. : 13/351782
DATED : June 23, 2015
INVENTOR(S) : Limin Wang et al.

It is certified that error appears in the above-identified patent and that said Letters Patent is hereby corrected as shown below:

Title Page, Item (73) Assignee name should be --Google Technology Holdings LLC--

Signed and Sealed this
Twenty-third Day of February, 2016

Michelle K. Lee
*Director of the United States Patent and Trademark Office*